US012361216B2

(12) United States Patent
Singh et al.

(10) Patent No.: US 12,361,216 B2
(45) Date of Patent: *Jul. 15, 2025

(54) ADVERSARIAL INPUT GENERATION FOR NATURAL LANGUAGE PROCESSING MACHINE LEARNING MODELS

(71) Applicant: Wells Fargo Bank, N.A., San Francisco, CA (US)

(72) Inventors: Rahul Singh, Charlotte, NC (US); Karan Jindal, Indian Land, SC (US); Yufei Yu, Charlotte, NC (US); Hanyu Yang, Charlotte, NC (US); Tarun Joshi, Forest Hills, NY (US); Matthew A. Campbell, Charlotte, NC (US); Wayne B. Shoumaker, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,125

(22) Filed: Apr. 11, 2024

(65) Prior Publication Data

US 2024/0273293 A1 Aug. 15, 2024

Related U.S. Application Data

(63) Continuation of application No. 17/443,309, filed on Jul. 23, 2021, now Pat. No. 11,972,211.

(60) Provisional application No. 63/201,185, filed on Apr. 16, 2021.

(51) Int. Cl.
*G06F 40/284* (2020.01)
*G06N 3/04* (2023.01)
*G06N 3/08* (2023.01)

(52) U.S. Cl.
CPC ............. *G06F 40/284* (2020.01); *G06N 3/04* (2013.01); *G06N 3/08* (2013.01)

(58) Field of Classification Search
None
See application file for complete search history.

(56) References Cited

U.S. PATENT DOCUMENTS

2017/0075985 A1* 3/2017 Chakraborty ....... G06F 16/3329
2017/0091287 A1* 3/2017 Wang ................. G06F 16/2465

OTHER PUBLICATIONS

U.S. Appl. No. 17/443,309 U.S. Pat. No. 11,972,211, filed Jul. 23, 2021, Adversarial Input Generation for Natural Language Processing Machine Learning Models.

(Continued)

*Primary Examiner* — Quynh H Nguyen
(74) *Attorney, Agent, or Firm* — SCHWEGMAN LUNDBERG & WOESSNER, P.A.

(57) ABSTRACT

Disclosed in some examples are methods, systems, and machine readable mediums which provide summaries of topics determined within a corpus of documents. These summaries may be used by customer service associates, analysts, or other users to quickly determine both topics discussed and contexts of those topics over a large corpus of text. For example, a corpus of documents may be related to customer complaints and the topics may be summarized to produce summaries such as "credit report update due to stolen identity." These summarizations may be used to efficiently spot trends and issues.

20 Claims, 6 Drawing Sheets

(56) References Cited

OTHER PUBLICATIONS

"U.S. Appl. No. 17/443,309, Examiner Interview Summary mailed Dec. 15, 2023", 2 pgs.

"U.S. Appl. No. 17/443,309, Non Final Office Action mailed Sep. 21, 2023".

"U.S. Appl. No. 17/443,309, Notice of Allowance mailed Jan. 10, 2024", 5 pgs.

"U.S. Appl. No. 17/443,309, Response filed Dec. 21, 2023 to Non Final Office Action mailed Sep. 21, 2023".

"Consumer Complaint Database", [Online]. Retrieved from the Internet: <URL: https://web.archive.org/web/20201214141307/https://www.consumerfinance.gov/data-research/consumer-complaints/>, (Dec. 14, 2020), 4 pgs.

Alzantot, M, et al., "Generating natural language adversarial examples", Computer Science > Computation and Language arXiv:1804.07998, (Sep. 24, 2018), 9 pgs.

Arras, L, et al., ""What is relevant in a text document?": An interpretable machine learning approach", Computer Science > Computation and Language arXiv:1612.07843, (Dec. 23, 2016), 19 pgs.

Biggio, Battista, et al., "Poisoning Attacks against Support Vector Machines", Computer Science > Machine Learning arXiv:1206.6389, (Mar. 25, 2013), 8 pgs.

Boser, B E, et al., "A Training Algorithm for Optimal Margin Classifiers", Proceedings of the Fifth Annual Workshop on Computational Learning Theory, (Jul. 1992), 9 pgs.

Chen, et al., "XGBoost: A scalable tree boosting system", Proceedings of the 22nd ACM SIGKDD International Conference on Knowledge Discovery and Data Mining, pp. 785-794 Aug. 2016., <https://doi.org/10.1145/2939672.2939785>, (Aug. 2016), 10 pgs.

Devlin, Jacob, et al., "BERT: Pre-training of Deep Bidirectional Transformers for Language Understanding", (2018), 14 pgs.

Ebrahimi, J, et al., "Hotflip: White-box adversarial examples for text classification", Computer Science > Computation and Language arXiv:1712.06751, (May 24, 2018), 6 pgs.

Garg, S, et al., "BAE: BERT-based Adversarial Examples for Text Classification", Computer Science > Computation and Language arXiv:2004.01970, (Oct. 8, 2020), 9 pgs.

Goodfellow, Ian, et al., "Explaining and Harnessing Adversarial Examples", Published as a conference paper at ICLR. arXiv:1412.6572v3, (Mar. 20, 2015), 11 pgs.

Jacovi, A, et al., "Understanding convolutional neural networks for text classification", Computer Science > Computation and Language arXiv:1809.08037, (Apr. 27, 2020), 10 pgs.

Jia, R, et al., "Adversarial examples for evaluating reading comprehension systems", Computer Science > Computation and Language arXiv:1707.07328, (Jul. 23, 2017), 11 pgs.

Jin, D, et al., "Is BERT Really Robust? A Strong Baseline for Natural Language Attack on Text Classification and Entailment", Computer Science > Computation and Language arXiv:1907.11932, (Apr. 8, 2020), 9 pgs.

Li, L, et al., "BERT-ATTACK: Adversarial Attack Against BERT Using BERT", Proceedings of the 2020 Conference on Empirical Methods in Natural Language Processing, pp. 6193-6202, (Nov. 2020), 10 pgs.

Liang, Bin, et al., "Deep text classification can be fooled", Computer Science > Cryptography and Security arXiv:1704.08006, (2017), 8 pgs.

Morris, J X, et al., "TextAttack: A Framework for Adversarial Attacks, Data Augmentation, and Adversarial Training in NLP", Computer Science > Computation and Language arXiv:2005.05909, (Oct. 5, 2020), 15 pgs.

Papernot, Nicolas, et al., "Transferability in Machine Learning: from Phenomena to Black-Box Attacks using Adversarial Samples", Computer Science > Cryptography and Security arXiv:1605.07277, (May 24, 2016), 13 pgs.

Pennington, et al., "GloVe: Global Vectors for Word Representation", Retrieved from: <https://nlp.stanford.edu/Projects/glove/>, (Aug. 2014), 3 pgs.

Radford, Alec, et al., "Language Models are Unsupervised Multitask Learners", author preprint, (2018), 24 pgs.

Ribeiro, M T, et al., ""Why Should I Trust You?" Explaining the Predictions of Any Classifier", Computer Science > Machine Learning arXiv:1602.04938, (Aug. 9, 2016), 10 pgs.

Singh, R., et al., "Model Robustness with Text Classification: Rule-based, semantic-preserving adversarial attacks", arxiv 2008.05536, (2020), 12 pgs.

Smola, Alex J, et al., "A Tutorial on Support Vector Regression", Statistics and Computing 14: 199-222, (2004), 24 pgs.

Suranjana, S, et al., "Towards crafting text adversarial samples", Computer Science > Machine Learning arXiv:1707.02812, (Jul. 10, 2017), 11 pgs.

Szegedu, C, et al., "Intriguing properties of neural networks", arXiv preprint arXiv:1312.6199, (Feb. 19, 2014), 10 pgs.

\* cited by examiner

ADVERSARIAL INPUT GENERATION FOR NATURAL LANGUAGE PROCESSING MACHINE LEARNING MODELS

PRIORITY CLAIM

This patent application is a continuation of U.S. patent application Ser. No. 17/443,309, filed Jul. 23, 2021, which claims the benefit of priority, under 35 U.S.C. Section 119 to U.S. Provisional Patent Application Ser. No. 63/201,185, entitled "Robustness Tests of NLP Machine Learning Models: Search and Semantically Replace," filed on Apr. 16, 2021 to Singh, et al, each of which is hereby incorporated by reference herein in its entirety.

TECHNICAL FIELD

Embodiments pertain to automated natural language processing. Some embodiments relate to evaluating robustness of natural language processing. Additional embodiments relate to enhanced robustness of natural language processing models.

BACKGROUND

The field of Natural Language Processing (NLP) concerns the understanding of human language by computer systems and the use of that understanding to interact with humans in a way that is useful. NLP algorithms frequently use machine-learning methods such as neural networks to understand human language. For example, a natural language processing algorithm may analyze a given sentence or group of sentences to understand a topic of the given sentence or group of sentences. The topic may then be used for various tasks, such as filtering large data sets, text summarization, and other uses. Other NLP tasks may include machine translations, question answering (such as chat bots), and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
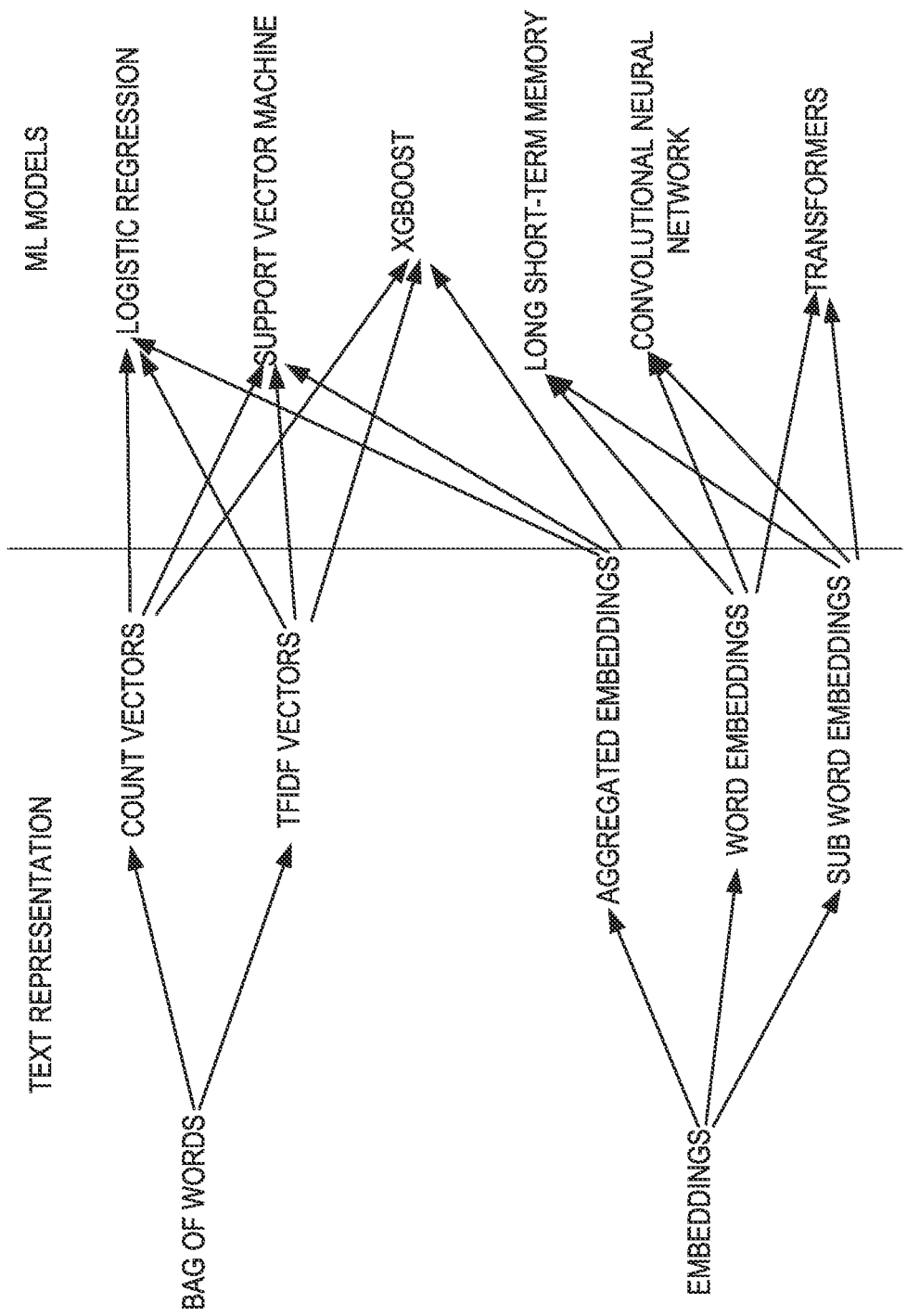
FIG. 1 illustrates a mapping of a text representation to machine learning models according to some examples of the present disclosure.

NLP models used in the real world often operate under dynamically changing environments that may cause degradation of the model's performance. For example, in text classification problems, small perturbations in input data can change a model's decision. As a result, during model development, the developer is not only interested in developing a model with the best performance (in terms of static data), but also in a model that is robust (i.e., with minimum performance degradation) under different operating conditions and different sets of input data. An adversarial attack on a machine learning model is a process for generating such perturbations.

Adversarial attacks have also been shown to degrade the performance of deep neural networks (DNN), support vector machines (SVM), tree-based ensemble models, and others. In these examples, small perturbations in out-of-sample data may cause substantial performance drops. These adversarial attacks can be used to evaluate a machine learning model's robustness by measuring the drop in performance when they are applied as input to the model. Such tests can also be used to create more robust models through a process called adversarial training. With NLP the inputs are textual data and hence, the adversarial attacks refer to perturbations in the textual domain. Examples of textual perturbation include changes at the character level, word level, and sentence level. Adversarial conditions affect various types of NLP tasks including, for example, text classification, machine translation, and question answering.

Perturbations on the order of character level changes such as adding or deleting words may create adversarial text, but these perturbations tend to change the meaning of text and can be easily detected. Synonym replacement provides a better option to create text that preserves the original semantics of the original text. However, word level similarity does not necessarily imply text level similarity. For example, synonym replacement can still change the semantic content of the text.

Disclosed in some examples are methods, systems, devices, and machine-readable mediums for generating adversarial text for assessing robustness of NLP models as well as hardening the NLP model against such attacks. The system first finds important tokens (e.g., words) in a corpus of text (e.g., test data or training data used to test or train the model being tested). The system then selects one or more replacement tokens. The system then filters the set of one or more replacement tokens so that replacement tokens that change the semantic meaning of the text are removed from the set of one or more replacement tokens. Finally, adversarial text is created by replacing the important tokens in the corpus with replacements identified that did not change the meaning of the text. In some examples, the resulting adversarial text may be used to retrain or refine the NLP model. Tokens are grammatical units, such as words, phrases, or the like.

The methods, systems, devices, and machine-readable mediums disclosed herein may be applied to any number of models developed for any number of NLP tasks. For example, NLP tasks such as categorization of customer complaints that were written in free text form; classification of social media posts; spam and phishing detection; machine translation; chat bots; and the like. The present disclosure solves the technical problem of automatically assessing the robustness of NLP models and hardening them against minor perturbations by applying automated methods of generating adversarial text and by retraining the NLP models if the adversarial text results in a change in model decision. In some examples, this is done using a white-box method where information about the structure of the NLP model is known. For example, weight parameters of a model (such as the input weights of a neural network). In other examples, this may be done without knowledge of the structure of the NLP model.

Example NLP machine learning models include logistic regression, support vector machine (SVM), extreme gradient boosting (XGBoost), long short-term memory (LSTM), convolution neural network (CNN) and Deep Learning Neural Networks (DNN). In some examples, the disclosed methods may utilize the representation of the text in numeric format. For example, a sparse vector representation represents the input as a high-dimensional sparse vector. Each value in the vector represents a word and a word's representation vector has all zero values except the index of the word, which is filled with some non-zero value. The following are some examples of the sparse vector representations:

Bag of words (BoW)—The value in the vector is filled with the frequency of the word in a single document.

Term frequency-inverse document frequency (Tf-idf)—The text is represented in the form of a vector equal to the size of the vocabulary of text disregarding the grammar and semantics of text. The values in the vector are filled with tf-idf values.

$$tfidf_{w,d} = TF_{w,d} * \log \frac{D}{D_w}$$

$TF_{w,d}$ represents the frequency of word w in document d. D represents the total number of documents and $D_w$ represents total number of documents in which word w occurs.

Word vectors which represent the text in the form of a two dimensional vector.

$$v_d = \begin{bmatrix} \bar{v}_1 \\ \vdots \\ \bar{v}_n \end{bmatrix}_{n \times m}$$

n is the number of words, m is the embedding dimension, and $\bar{v}_w$ is the embedding vector for word w.

Aggregated Word Vectors—The embeddings of words are aggregated to create a text level embedding representation.

$$v_d = \frac{\sum weight_w^o \bar{v}_w}{\sum weight_w}$$

$weight_w$ represents the weights for word w, and $\bar{v}_w$ represents the embedding vector for word W.

FIG. 1 illustrates a mapping of a text representation to machine learning models according to some examples of the present disclosure. The Figure shows mappings between the types of text representations and the machine learning model types that these representations use.

Figure 2:
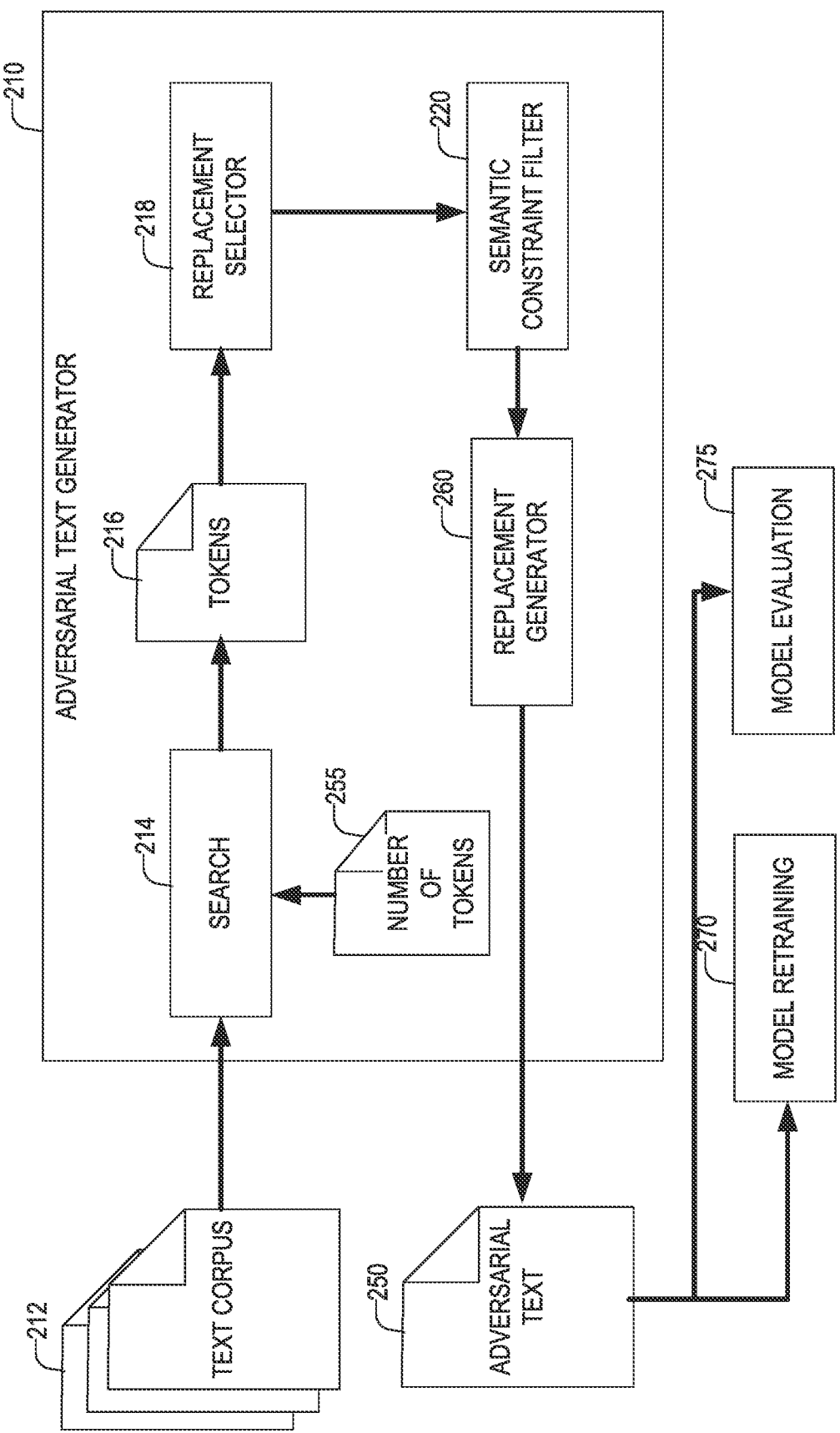
FIG. 2 illustrates a logical diagram of an adversarial text generator component according to some examples of the present disclosure.
Figure 6:
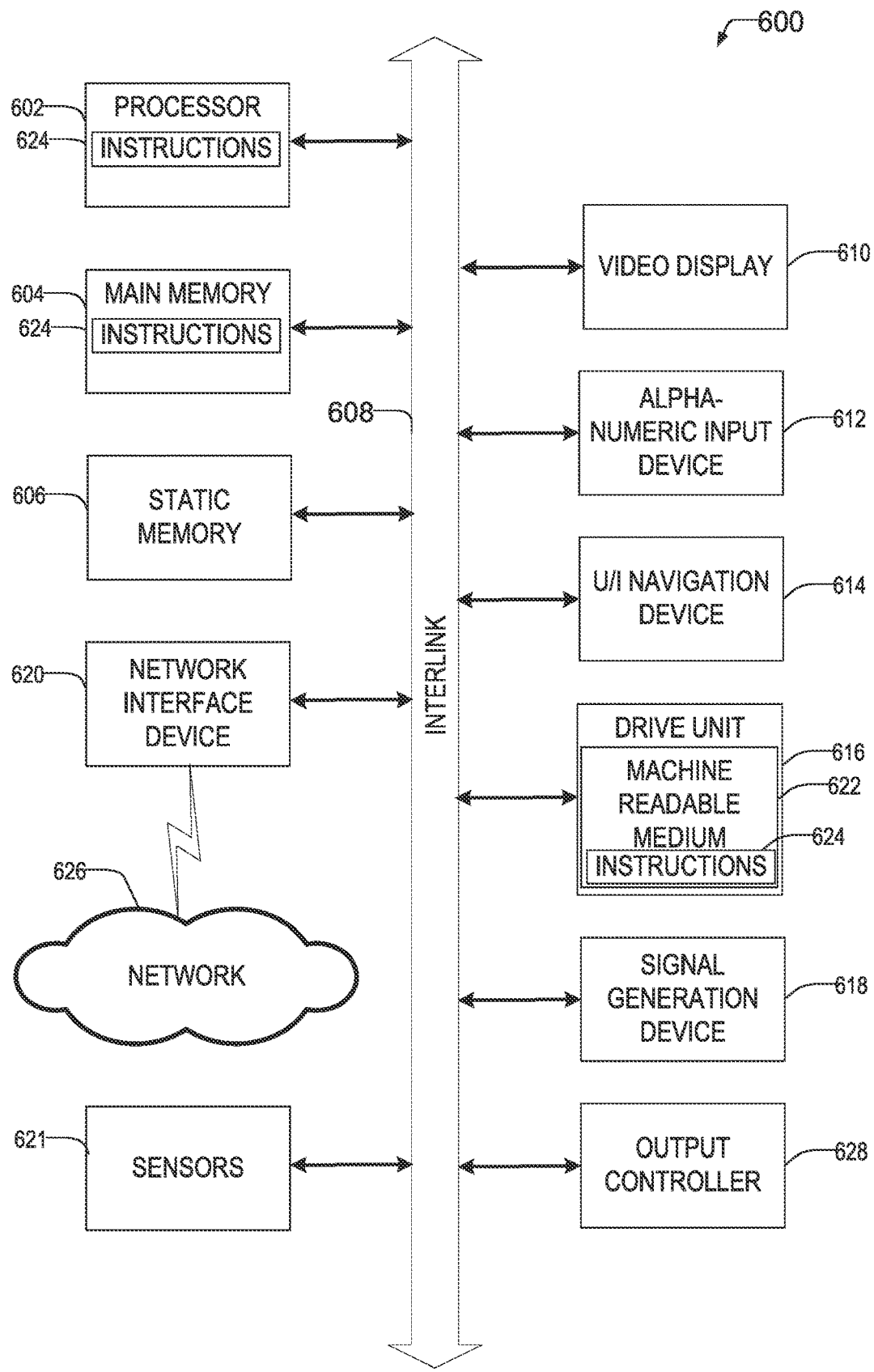
FIG. 6 is a block diagram illustrating an example of a machine upon which one or more embodiments may be implemented.

FIG. 2 illustrates a logical diagram of an adversarial text generator component 210 according to some examples of the present disclosure. Adversarial text generator component 210 may be implemented by one or more computing devices, such as shown in FIG. 6. Text corpus 212, which may be from training data, test data, or may be any other document corpus, may be searched via search component 214. Text corpus 212 may comprise a plurality of discrete language units such as sentences, paragraphs, or the like. Search component 214 may find important tokens in the discrete language units of the text corpus 212 that have a likelihood that exceeds a threshold of changing the model decision. Tokens may be a part of speech that is shorter than the discrete language unit such as words or short phrases. In some examples, search component 214 may use knowledge of the structure of the model for which the adversarial text is being generated to perform the search—for example, by using model weightings. A configurable parameter, number of tokens 255, may determine the number of tokens that the search component is to find within a particular discrete language unit. For example, the number of tokens 255 may specify that the search component 214 is to find one word per sentence.

In some examples, the search component 214 may use a local interpretable model-agnostic explanations (LIME) method. In LIME, a local fidelity is calculated that extracts the explanation that reflects the behavior of the classifier for a particular instance in the form of important n-grams. This technique may be model-agnostic and may not need to have knowledge of the model. LIME is a local explanation method for a machine learning model and finds important tokens given a single text input and its model prediction. LIME creates a local linear model that describe points in a local region surrounding the text input. Using local linear model parameters, it tries the explain given model decision in terms of important tokens.

In other examples, the search component 214 may use a gradient method in which the system backpropagates the gradient to the embedding layer and extracts the x tokens that have the highest contribution to the gradient of loss with respect to the input layer. X may be equal to the number of tokens 255. In still other examples, the search component 214 may use a weight based method in which the distance of all words from the hyperplane (or the probability logits) are calculated from the NLP model for which adversarial text is being generated. For example, Score(w)=f(h(w)) where w represents the token, h(w) represents the text representation of the token (i.e., embedding vector, one hot encoding, etc.) and f is the target model. In this method, the highest x scores may be used as the tokens 216—where x may be equal to the number of tokens 255.

In still other examples, the search component 214 may use a layer-wise relevance propagation (LRP) technique. According to the layer-wise conservation principle, the total relevance at each layer of the neural network is conserved. The system uses the relevance at the embedding layer. $\Sigma_{i,t} R_{i,t} = \Sigma_{j,t} R_{j,t} = \Sigma_j R_j = \Sigma_k R_k$ where $R_k$ is the final prediction of the model before softmax, $R_j$ is the relevance at the maxpool layer, $R_{j,t}$ is the relevance at the convolution layer, and $R_{i,t}$ is the relevance at the embedding layer. This method provides scores to different tokens in the input. Using those scores different tokens may be ranked to quantify their importance. Tokens above a predetermined rank may be selected by search component 214.

Other examples of token selection may select the x tokens that have a highest term frequency, inverse document frequency (Tf-idf) values, random tokens, or the like. Where x may be equal to the number of tokens 255.

In some examples, the method used by the search component may be based upon the text representation used by the model the system is generating adversarial text for. For example, for bag of words representations, random, LIME, weights or tf-idf may be used. For aggregated word vectors, random, LIME, distance from hyperplane, and tf-idf methods may be used. For deep learning neural network models, random, LIME, tf-idf, LRP, and Gradient may be used.

Once tokens 216 are generated, replacement selector component 218 may select, for each of tokens 216, one or more replacement tokens. Replacement selector component 218 may use an embedding space algorithm to find a closest words to the tokens in an embedding space. For example, by selecting a replacement token (different from the token to be replaced) with a maximum score. Where the score is defined as:

$$\text{Score } (w') = \cos\,\textit{ine }\text{similarity}(w'_{emb}, w_{emb})$$

Where $w'_{emb}$ and $W_{emb}$ represent the embedding vectors of w' and w respectively.

In other examples, a GPT2 is used which predicts a next token based upon previous tokens fed to the algorithm. GPT2 is described in A. Radford, J. Wu, R. Child, D. Luan, D. Amodei and I. Sutskever, "Language Models are Unsupervised Multitask Learners," arxiv, 2018. GPT2 is a language model that is used to predict the next token in a text given the history of tokens. GPT2 gives probabilities to the different tokens in the vocabulary and the token that has the highest probability score is picked as the next token in the sentence. GPT2 is based on a transformer architecture and trained using self-supervised language modeling.

In yet other examples, randomly generated tokens may be selected from a dictionary and used as replacement tokens.

The replacement tokens may then be passed, along with the text corpus 212, and the tokens 216 to the semantic constraint filter component 220. The semantic constraint filter component 220 may remove from the set of replacement tokens, the replacement tokens that do not preserve the semantic and syntactic meaning of the discrete language units from text corpus 212. In some examples, the semantic constraint filter component 220 may use BERT, which is a masked language model that is used to find the most probable replacement from the set of possible tokens. BERT is described in J. Devlin, M. W. Chang, K. Lee and K. Toutanova, "BERT: Pre-training of Deep Bidirectional Transformers for Language Understanding," arXiv: 1810.04805, 2018. BERT is a language model based on transformer architectures similar to GPT2. However, BERT and GPT2 are trained differently. BERT is trained using mask language modeling objective and can be used to fill in missing tokens in a text. Similar to GPT2 it gives probabilities for missing tokens and one or more tokens with the highest probability is picked to ensure the semantic meaning is preserved. In some examples, the semantic quality of the sentences may be ensured by using both BERT and GPT2 language models. For example, GPT2 may be used to predict the next token and BERT may be used to confirm that prediction preserves the semantic meaning. In other examples, BERT may be used to predict the next token and GPT2 may be used to confirm the semantic meaning of the replacements.

In other examples, the semantic constraint filter component 220 may use a Part Of Speech tag. For example, if the initial token is a verb, non-verb replacement tokens are removed from consideration. Part of speech tagging may be done using databases which include tokens and their corresponding part of speech (e.g., whether they are a verb, noun, pronoun, and the like). In some examples, where tokens may be associated with multiple parts of speech, rules may specify the part of speech given the context within the sentence. For example, if an unknown word X is preceded by a determiner and followed by a noun, tag it as an adjective. In yet other examples, a hidden markov model or other NLP machine-learned model may be used to label tokens based upon their part of speech.

Other example algorithms for the semantic constraint filter component 220 may include ensuring that the semantic polarity of the original token and the replacement candidate token match. Semantic polarity labels words as a positive or a negative on a range between −1.0 to 1.0 where −1 is the most negative and 1 is the most positive. This may be done using tools such as TextBlob which is part of the Natural Language Toolkit (NLTK) provided by the NLTK project. Bird, Steven, Edward Loper and Ewan Klein (2009), Natural Language Processing with Python. O'Reilly Media Inc. Replacement tokens that have semantic polarities that do not match the original token from the text corpus 212 may be filtered out by the semantic constraint filter component 220.

An additional algorithm may include embedding constraints. Replacement token candidates with a cosine similarity score to the original tokens that is below a threshold may be removed from consideration.

In some examples, multiple tests may be used by the semantic constraint filter. That is, each replacement token may be scored based upon one or more of the above tests. Replacement tokens may then be assigned a total score that is an aggregate of the individual scores of the above mentioned tests. Replacement tokens that are below a threshold score may be eliminated from further consideration. In some examples, the individual scores may be weighted so that the total score is a weighted summation. Weights may be set manually or may be done using other machine learning algorithms.

Once replacement tokens are selected and those that change the semantic meaning are filtered out; the replacement generator 260 may generate a set of one or more replacement parts of speech by replacing the tokens selected by the search component 214 with one or more tokens selected by the replacement selector component 218 which are not filtered out by the semantic constraint filter component 220. In some examples, multiple parts of speech (e.g., sentences) may be generated for each token found by the search component 214 if the replacement selector component 218 finds multiple tokens that are not filtered by the semantic constraint filter component 220 for that part of speech. Adversarial text 250 may include one or more of the replacement parts of speech. This adversarial text may be used to retrain the model 270 or evaluate one or more models 275.

Figure 3:
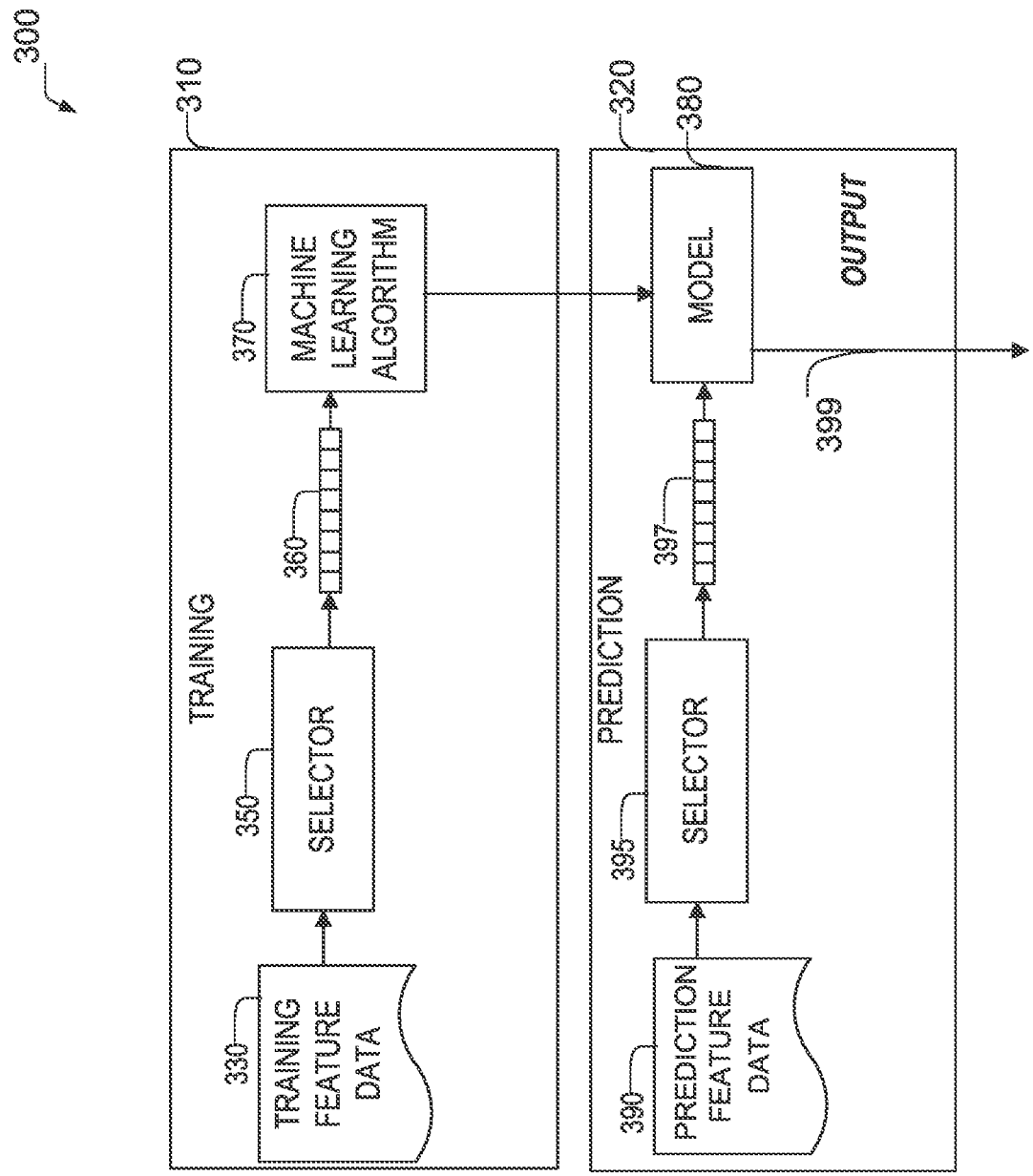
FIG. 3 illustrates an example machine learning module according to some examples of the present disclosure.

As noted, machine learning may be used to process natural language inputs, search for important tokens in text, find replacement tokens, test replacement tokens for semantic similarity, set weights for calculating an aggregated semantic similarity score, and to perform other tasks. FIG. 3 illustrates an example machine learning module 300 according to some examples of the present disclosure. The machine learning module 300 may be implemented in whole or in part by one or more computing devices. In some examples, the training module 310 may be implemented by a different device than the prediction module 320. In these examples, the model 380 may be created on a first machine and then sent to a second machine. One or more of modules 310 and 320 may be implemented on a same or a different computing device than adversarial text generator component 210. The machine learning module 300 may be implemented by a machine, such as machine 600.

Machine learning module 300 utilizes a training module 310 and a prediction module 320. Training module 310 inputs training feature data 330 into selector module 350. The training feature data 330 may include a training corpus of documents. The training feature data 330 may be labeled with the objective of the model. For example, if the model is detecting a topic of the document, the topic may be given along with the document. In other examples, the training data may not be labeled. For example, the model may use feedback data—such as through a reinforcement learning method.

Selector module 350 selects training vector 360 from the training feature data 330. The selected data may fill training vector 360 and comprises a set of the training data that is determined to be predictive of the desired result. Information chosen for inclusion in the training vector 360 may be all the training feature data 330 or in some examples, may be a subset of all the training feature data 330. The training vector 360 may be utilized (along with any applicable labels) by the machine learning algorithm 370 to produce a model 380. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In some examples, the selector 350 may be part of the machine learning algorithm 370.

In the prediction module 320, prediction feature data 390 may be input to the selector module 395. In some examples, the prediction feature data 390 may be a corpus of one or more documents that represent natural language text. Selector module 395 may operate the same, or differently than selector module 350. In some examples, selector modules 350 and 395 are the same modules or different instances of the same module. Selector module 395 produces vector 397, which is input into the model 380 to produce an output 399. For example, the weightings and/or network structure learned by the training module 310 may be executed on the vector 397 by applying vector 397 to a first layer of the model 380 to produce inputs to a second layer of the model 380, and so on until the output is reached. As previously noted, other data structures may be used other than a vector (e.g., a matrix). In some examples, selector modules 350, 395 may not be used in one or both of the training module 310 and prediction module 320 respectively.

The training module 310 may operate in an offline manner to train the model 380. The prediction module 320, however, may be designed to operate in an online manner. It should be noted that the model 380 may be periodically updated via additional training and/or user feedback. For example, additional training feature data 330 may be collected as users provide feedback on the output. The feedback, along with the prediction feature data 390 corresponding to that feedback, may be used to refine the model by the training module 310.

The machine learning algorithm 370 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, LDA models, and hidden Markov models. Examples of unsupervised learning algorithms include expectation-maximization algorithms, vector quantization, and information bottleneck method.

In some examples, where the model is an NLP classification model, the training feature data 330 and the prediction feature data 390 may comprise documents and the output 399 may be a particular classification, such as a labelled topic.

In some examples, where the model searches for important terms, the training feature data 330 and the prediction feature data 390 may comprise one or more language units (e.g., sentences) and a label of the important tokens. Training feature data 330 may also include one or more descriptors of the model for which adversarial testing is being done. For example, model weights. The output 399 may be important tokens in the prediction feature data 390.

In some examples, where the model finds replacement terms, the training feature data 330 and the prediction feature data 390 may comprise one or more tokens and one or more replacement tokens. The output 399 may be a replacement token for the prediction feature data 390.

In some examples, where the model assesses whether a replacement token is semantically similar to the original token, the training feature data 330 and prediction feature data 390 may be an original token and a replacement token. The training feature data 330 may be labelled as to whether the replacement token is semantically consistent to the original token. The output 399 may be an indication as to whether the prediction feature data 390 includes a replacement token for an included original token.

Figure 4:
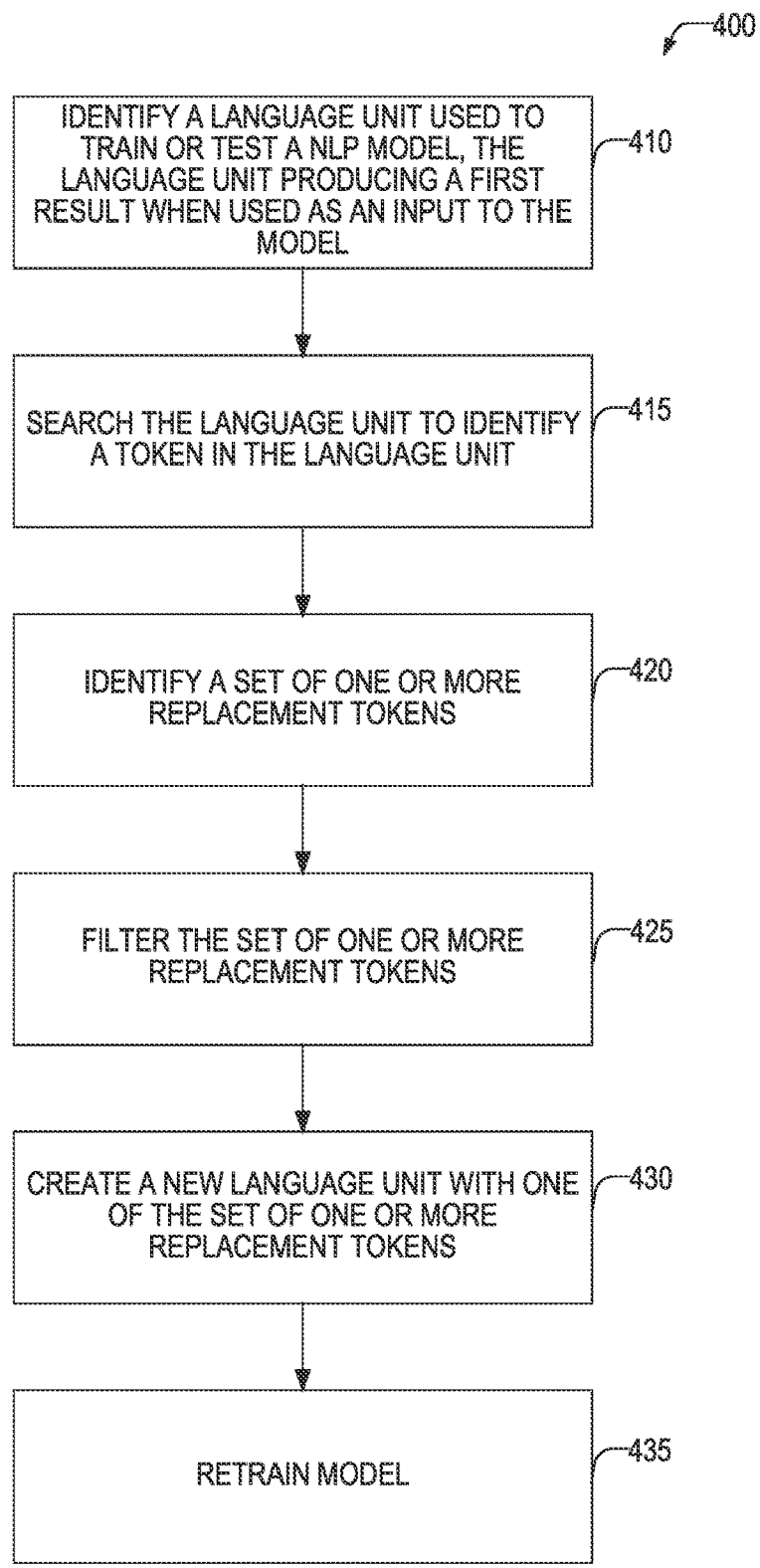
FIG. 4 illustrates a flowchart of a method for creating adversarial text for use in evaluating or strengthening NLP models according to some examples of the present disclosure.

FIG. 4 illustrates a flowchart of a method 400 for creating adversarial text for use in evaluating or strengthening NLP models according to some examples of the present disclosure. At operation 410 the system may identify a language unit such as a sentence in a text corpus. The text corpus may be used to train or test a natural language processing machine learned model, the language unit producing a first result when used as input to the model. For example, the model may be a classification algorithm that produces a topic of the text.

At operation 415 the system may search the language unit to identify a token in the text unit that has a probability of changing the result of the NLP model (e.g., greater than a threshold chance). For example, the system may use parameters of the model. In other examples, the system may not use parameters of the model. The token may be one or more words, phrases, sentences, or the like that are determined by the search algorithm to be important in the model producing the first result. For example, one or more tokens that are most likely to change the model decision. The search algorithms may be algorithms such as LIME, Gradient, weight based methods, LRP, and the like. The search algorithm may be selected based upon the type of model. That is, the system may have one or more parameters that specify the type of model and, when performing the search, may select one or more algorithms, from a plurality of available algorithms, to use based upon the type of model. In some examples, multiple algorithms may be used. For example, each algorithm may identify one or more tokens. In these examples, all the identified tokens from all the algorithms may be used.

At operation 420, the system may, for each particular token identified by operation 415, identify a set of one or more replacement tokens based upon the particular token. For example, the system may use an embedding space model, a GPT2, or random methods. At operation 425, the system may filter the set of one or more replacement tokens to remove one or more of the replacement tokens that, if used to replace the token, would change a semantic meaning of the language unit. For example, the system may use a BERT, POS tag, Semantic Polarity, or embedding constraint algorithm to determine if there was a change in semantic meaning. Tokens which change the semantic meaning may be discarded. At operation 425, the system may create one or more new language units (adversarial sentences) by replacing the token with one of the set of one or more replacement tokens, the new language unit producing a second result when used as input to the model. At operation 430, the system may utilize the adversarial text units (e.g., sentences) to perform one or more automated or manual tasks, such as evaluating the effectiveness of one or more NLP models, retraining one or more models to improve robustness (such as at operation 435), or the like.

Figure 5:
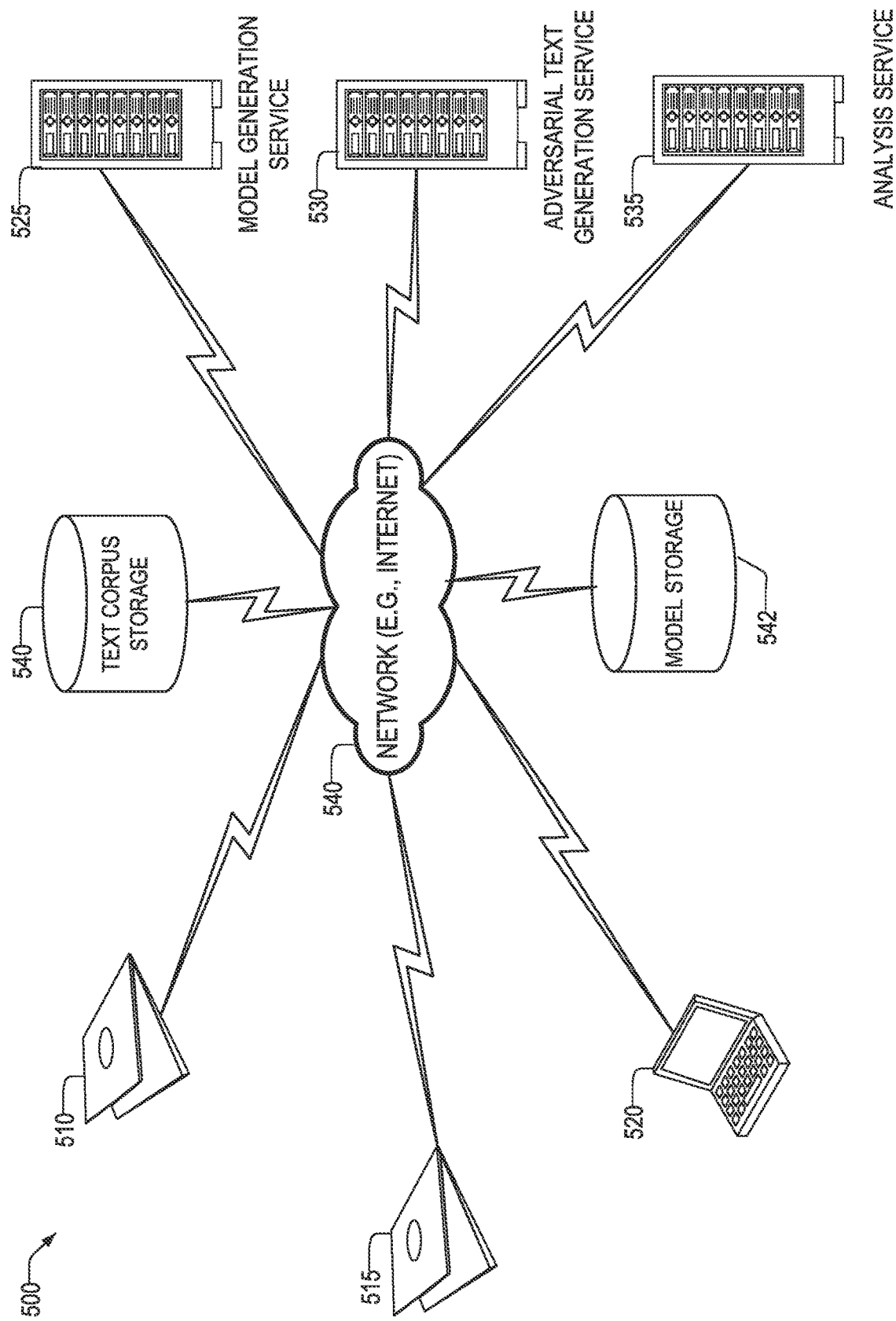
FIG. 5 illustrates an example environment of the adversarial text generation according to some examples of the present disclosure.

FIG. 5 illustrates an example environment 500 of the adversarial text generation according to some examples of the present disclosure. The model generation service 525 may use one or more machine learning modules, such as machine learning module 300 to produce one or more NLP models from text in a text corpus storage 540. These models may be stored in the model generation service 525, or may be stored in a network-accessible storage, such as model storage 542. Adversarial text generation service 530 may use the text stored in the text corpus storage 540, model information from one or more models of the model storage 542 to generate adversarial text. In some examples, the adversarial text generation service 530 may implement the adversarial text generator component 210, machine learning module 300, and method 400. The adversarial text may be used by analysis service 535 to evaluate one or more models in model storage 542 for robustness to adversarial text. In other examples, the adversarial text may be used by model generation service 525 to retrain the model.

User devices 510, 515, and 520 may access one or more of model generation service 525, adversarial text generation service 530, and analysis service 535 to generate models, generate adversarial text, analyze the robustness of one or more models, retrain the models (based upon the adversarial text), use the models to analyze text, and the like. One or more of the model generation service 525, adversarial text generation service 530, and analysis service 535 may provide one or more user interfaces to the user devices 510, 515, and 520 to allow the devices to generate models, generate adversarial text, analyze the robustness of one or more models, retrain the models (based upon the adversarial text), use the models to analyze text, and the like. User devices 510, 515, and 520 may be end user devices, administrator devices, developer devices, and/or the like.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, machine 600 may be a server for a model generation service 525, adversarial text generation service 530, analysis service 535, or the like. Machine 600 may be a user computing device 510, 515, or 520. Machine 600 may implement a model storage 542 and text corpus storage 540. Similarly, machine 600 may be configured to implement the adversarial text generator component 210, training and/or prediction modules 310 and 320, and to perform method 400. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Additionally, while example components of machine 600 are shown, it will be appreciated by a person of ordinary skill in the art with the benefit of this disclosure that the components shown are exemplary and additional components and/or fewer components may be used.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a method comprising: identifying a sentence used to train or test a natural language processing machine learned model, the sentence producing a first result when used as input to the model; searching the sentence using parameters of the model to identify a token in the sentence; identifying a set of one or more replacement tokens based upon the token and a second model; filtering the set of one or more replacement tokens to remove one or more of the replacement tokens that, if used to replace the token, would change a semantic meaning of the sentence; creating a new sentence by replacing the token with one of the set of one or more replacement tokens that passes the filter, the new sentence producing a second result when used as input to the model; and retraining the natural language processing machine learned model using the new sentence and the first result, the retrained model producing the first result when the new sentence is input to the natural language processing machine learned model.

In Example 2, the subject matter of Example 1 includes, wherein searching the sentence using parameters of the model to identify a token in the sentence comprises selecting a search algorithm based upon a type of natural language processing machine learned model.

In Example 3, the subject matter of Examples 1-2 includes, wherein searching the sentence using parameters of the model to identify a token in the sentence comprises using a Local Interpretable Model Agnostic Explanations (LIME) algorithm.

In Example 4, the subject matter of Examples 1-3 includes, wherein searching the sentence using parameters of the model to identify a token in the sentence comprises finding a distance of all tokens in the sentence from a hyperplane of the model.

In Example 5, the subject matter of Examples 1-4 includes, wherein searching the sentence using parameters of the model to identify a token in the sentence comprises a layer-wise relevance propagation of an embedding layer of the model.

In Example 6, the subject matter of Examples 1-5 includes, wherein searching the sentence using parameters of the model to identify a token in the sentence comprises utilizing a token with a highest term frequency inverse document frequency value.

In Example 7, the subject matter of Examples 1-6 includes, wherein identifying a set of one or more replacement tokens based upon the token and a second model comprises finding a set of one or more words in an embedding space that are below a specified threshold distance to the token.

In Example 8, the subject matter of Examples 1-7 includes a GPT2 algorithm.

In Example 9, the subject matter of Examples 1-8 includes, wherein filtering the set of one or more replacement tokens to remove one or more of the replacement tokens that, if used to replace the token, would change a semantic meaning of the sentence comprises selecting a most probable replacement token from the set of one or more replacement tokens using a BERT algorithm.

In Example 10, the subject matter of Examples 1-9 includes, wherein filtering the set of one or more replacement tokens to remove one or more of the replacement tokens that, if used to replace the token, would change a semantic meaning of the sentence comprises selecting one of the one or more replacement tokens that is a same part of speech.

In Example 11, the subject matter of Examples 1-10 includes, wherein filtering the set of one or more replacement tokens to remove one or more of the replacement tokens that, if used to replace the token, would change a semantic meaning of the sentence comprises filtering out tokens that do not have a same semantic polarity.

In Example 12, the subject matter of Examples 1-11 includes, wherein filtering the set of one or more replacement tokens to remove one or more of the replacement tokens that, if used to replace the token, would change a semantic meaning of the sentence comprises filtering out tokens with a cosine similarity to the token that is below a threshold similarity.

Example 13 is a computing device comprising: a processor; a memory, the memory storing instructions, which when executed by the processor, causes the computing device to perform operations comprising: identifying a sentence used to train or test a natural language processing machine learned model, the sentence producing a first result when used as input to the model; searching the sentence using parameters of the model to identify a token in the sentence; identifying a set of one or more replacement tokens based upon the token and a second model; filtering the set of one or more replacement tokens to remove one or more of the replacement tokens that, if used to replace the token, would change a semantic meaning of the sentence; creating a new sentence by replacing the token with one of the set of one or more replacement tokens that passes the filter, the new sentence producing a second result when used as input to the model; and retraining the natural language processing machine learned model using the new sentence and the first result, the retrained model producing the first result when the new sentence is input to the natural language processing machine learned model.

In Example 14, the subject matter of Example 13 includes, wherein the operations of searching the sentence using parameters of the model to identify a token in the sentence comprises selecting a search algorithm based upon a type of natural language processing machine learned model.

In Example 15, the subject matter of Examples 13-14 includes, wherein the operations of searching the sentence using parameters of the model to identify a token in the sentence comprises using a Local Interpretable Model Agnostic Explanations (LIME) algorithm.

In Example 16, the subject matter of Examples 13-15 includes, wherein the operations of searching the sentence using parameters of the model to identify a token in the sentence comprises finding a distance of all tokens in the sentence from a hyperplane of the model.

In Example 17, the subject matter of Examples 13-16 includes, wherein the operations of searching the sentence using parameters of the model to identify a token in the sentence comprises a layer-wise relevance propagation of an embedding layer of the model.

In Example 18, the subject matter of Examples 13-17 includes, wherein the operations of searching the sentence using parameters of the model to identify a token in the sentence comprises utilizing a token with a highest term frequency inverse document frequency value.

In Example 19, the subject matter of Examples 13-18 includes, wherein the operations of identifying a set of one or more replacement tokens based upon the token and a second model comprises finding a set of one or more words in an embedding space that are below a specified threshold distance to the token.

In Example 20, the subject matter of Examples 13-19 includes a GPT2 algorithm.

In Example 21, the subject matter of Examples 13-20 includes, wherein the operations of filtering the set of one or more replacement tokens to remove one or more of the replacement tokens that, if used to replace the token, would change a semantic meaning of the sentence comprises selecting a most probable replacement token from the set of one or more replacement tokens using a BERT algorithm.

In Example 22, the subject matter of Examples 13-21 includes, wherein the operations of filtering the set of one or more replacement tokens to remove one or more of the replacement tokens that, if used to replace the token, would change a semantic meaning of the sentence comprises selecting one of the one or more replacement tokens that is a same part of speech.

In Example 23, the subject matter of Examples 13-22 includes, wherein the operations of filtering the set of one or more replacement tokens to remove one or more of the replacement tokens that, if used to replace the token, would change a semantic meaning of the sentence comprises filtering out tokens that do not have a same semantic polarity.

In Example 24, the subject matter of Examples 13-23 includes, wherein the operations of filtering the set of one or more replacement tokens to remove one or more of the replacement tokens that, if used to replace the token, would change a semantic meaning of the sentence comprises filtering out tokens with a cosine similarity to the token that is below a threshold similarity.

Example 25 is a non-transitory machine-readable medium, storing instructions, which when executed by a machine, causes the machine to perform operations comprising: identifying a sentence used to train or test a natural language processing machine learned model, the sentence producing a first result when used as input to the model; searching the sentence using parameters of the model to identify a token in the sentence; identifying a set of one or more replacement tokens based upon the token and a second model; filtering the set of one or more replacement tokens to remove one or more of the replacement tokens that, if used to replace the token, would change a semantic meaning of the sentence; creating a new sentence by replacing the token with one of the set of one or more replacement tokens that passes the filter, the new sentence producing a second result when used as input to the model; and retraining the natural language processing machine learned model using the new sentence and the first result, the retrained model producing the first result when the new sentence is input to the natural language processing machine learned model.

In Example 26, the subject matter of Example 25 includes, wherein the operations of searching the sentence using parameters of the model to identify a token in the sentence comprises selecting a search algorithm based upon a type of natural language processing machine learned model.

In Example 27, the subject matter of Examples 25-26 includes, wherein the operations of searching the sentence using parameters of the model to identify a token in the sentence comprises using a Local Interpretable Model Agnostic Explanations (LIME) algorithm.

In Example 28, the subject matter of Examples 25-27 includes, wherein the operations of searching the sentence using parameters of the model to identify a token in the sentence comprises finding a distance of all tokens in the sentence from a hyperplane of the model.

In Example 29, the subject matter of Examples 25-28 includes, wherein the operations of searching the sentence using parameters of the model to identify a token in the sentence comprises a layer-wise relevance propagation of an embedding layer of the model.

In Example 30, the subject matter of Examples 25-29 includes, wherein the operations of searching the sentence using parameters of the model to identify a token in the sentence comprises utilizing a token with a highest term frequency inverse document frequency value.

In Example 31, the subject matter of Examples 25-30 includes, wherein the operations of identifying a set of one or more replacement tokens based upon the token and a second model comprises finding a set of one or more words in an embedding space that are below a specified threshold distance to the token.

In Example 32, the subject matter of Examples 25-31 includes a GPT2 algorithm.

In Example 33, the subject matter of Examples 25-32 includes, wherein the operations of filtering the set of one or more replacement tokens to remove one or more of the replacement tokens that, if used to replace the token, would change a semantic meaning of the sentence comprises selecting a most probable replacement token from the set of one or more replacement tokens using a BERT algorithm.

In Example 34, the subject matter of Examples 25-33 includes, wherein the operations of filtering the set of one or more replacement tokens to remove one or more of the replacement tokens that, if used to replace the token, would change a semantic meaning of the sentence comprises selecting one of the one or more replacement tokens that is a same part of speech.

In Example 35, the subject matter of Examples 25-34 includes, wherein the operations of filtering the set of one or more replacement tokens to remove one or more of the replacement tokens that, if used to replace the token, would change a semantic meaning of the sentence comprises filtering out tokens that do not have a same semantic polarity.

In Example 36, the subject matter of Examples 25-35 includes, wherein the operations of filtering the set of one or more replacement tokens to remove one or more of the replacement tokens that, if used to replace the token, would change a semantic meaning of the sentence comprises filtering out tokens with a cosine similarity to the token that is below a threshold similarity.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A method comprising:
using one or more computer processors:
identifying a discrete language unit (DLU) in a document corpus, the DLU used to train or test a first machine learned model used to provide a natural language understanding of input text, the DLU producing a first result when used as input to the first machine learned model, the first machine learned model being a natural language processing machine-learned model;
searching the DLU using parameters of the first machine learned model to identify a token in the DLU that influences an output of the first machine learned model;
identifying a set of one or more replacement tokens that do not change a semantic meaning of the DLU by executing a second machine learned model using the token as an input;
creating a new DLU by replacing the token with one of the set of one or more replacement tokens, the new DLU producing a second result when used as input to the first machine learned model; and
retraining the first machine learned model using the new DLU and the first result, the retrained first machine learned model producing the first result when the new DLU is input to the retrained first machine learned model; and
utilizing the retrained first machine learned model to provide a natural language understanding of input text.

2. The method of claim 1, wherein the DLU is a sentence.

3. The method of claim 2, wherein the token is one of: a word or phrase within the DLU.

4. The method of claim 1, wherein the set of one or more replacement tokens is identified based on a maximum cosine similarity score with the token.

5. The method of claim 1, wherein identifying the set of one or more replacement tokens that do not change a semantic meaning of the DLU by executing the second machine learned model using the token as an input comprises identifying one or more replacement tokens that maintain a same part of speech as the token to preserve the semantic meaning of the DLU.

6. The method of claim 1, wherein identifying the set of one or more replacement tokens that do not change a semantic meaning of the DLU by executing the second machine learned model using the token as an input comprises identifying one or more replacement tokens that maintain a same semantic polarity as the token to preserve the semantic meaning of the DLU.

7. The method of claim 1, wherein searching of the DLU comprises using a gradient method to identify the token based on a contribution to a gradient of loss with respect to an input layer of the first machine learned model.

8. A non-transitory machine-readable medium, storing instructions, which when executed by a machine, cause the machine to perform operations comprising:
identifying a discrete language unit (DLU) in a document corpus, the DLU used to train or test a first machine learned model used to provide a natural language understanding of input text, the DLU producing a first result when used as input to the first machine learned model, the first machine learned model being a natural language processing machine-learned model;

searching the DLU using parameters of the first machine learned model to identify a token in the DLU that influences an output of the first machine learned model;

identifying a set of one or more replacement tokens that do not change a semantic meaning of the DLU by executing a second machine learned model using the token as an input;

creating a new DLU by replacing the token with one of the set of one or more replacement tokens, the new DLU producing a second result when used as input to the first machine learned model; and retraining the first machine learned model using the new DLU and the first result, the retrained first machine learned model producing the first result when the new DLU is input to the retrained first machine learned model.

9. The non-transitory machine-readable medium of claim 8, wherein the DLU is a 9. sentence.

10. The non-transitory machine-readable medium of claim 9, wherein the token is one of: a word or phrase within the DLU.

11. The non-transitory machine-readable medium of claim 8, wherein the set of one or more replacement tokens is identified based on a maximum cosine similarity score with the token.

12. The non-transitory machine-readable medium of claim 8, wherein the operations of identifying the set of one or more replacement tokens that do not change a semantic meaning of the DLU by executing the second machine learned model using the token as an input comprises identifying one or more replacement tokens that maintain a same part of speech as the token to preserve the semantic meaning of the DLU.

13. The non-transitory machine-readable medium of claim 8, wherein the operations of identifying the set of one or more replacement tokens that do not change a semantic meaning of the DLU by executing the second machine learned model using the token as an input comprises identifying one or more replacement tokens that maintain a same semantic polarity as the token to preserve the semantic meaning of the DLU.

14. The non-transitory machine-readable medium of claim 8, wherein the operations of searching of the DLU comprises using a gradient method to identify the token based on a contribution to a gradient of loss with respect to an input layer of the first machine learned model.

15. A computing device comprising:

a processor;

a memory, storing instructions which when executed by the processor, cause the processor to perform operations comprising:

identifying a discrete language unit (DLU) in a document corpus, the DLU used to train or test a first machine learned model used to provide a natural language understanding of input text, the DLU producing a first result when used as input to the first machine learned model, the first machine learned model being a natural language processing machine-learned model;

searching the DLU using parameters of the first machine learned model to identify a token in the DLU that influences an output of the first machine learned model;

identifying a set of one or more replacement tokens that do not change a semantic meaning of the DLU by executing a second machine learned model using the token as an input;

creating a new DLU by replacing the token with one of the set of one or more replacement tokens, the new DLU producing a second result when used as input to the first machine learned model; and retraining the first machine learned model using the new DLU and the first result, the retrained first machine learned model producing the first result when the new DLU is input to the retrained first machine learned model.

16. The computing device of claim 15, wherein the DLU is a sentence.

17. The computing device of claim 16, wherein the token is one of: a word or phrase within the DLU.

18. The computing device of claim 15, wherein the set of one or more replacement tokens is identified based on a maximum cosine similarity score with the token.

19. The computing device of claim 15, wherein the operations of identifying the set of one or more replacement tokens that do not change a semantic meaning of the DLU by executing the second machine learned model using the token as an input comprises identifying one or more replacement tokens that maintain a same part of speech as the token to preserve the semantic meaning of the DLU.

20. The computing device of claim 15, wherein the operations of identifying the set of one or more replacement tokens that do not change a semantic meaning of the DLU by executing the second machine learned model using the token as an input comprises identifying one or more replacement tokens that maintain a same semantic polarity as the token to preserve the semantic meaning of the DLU.

* * * * *